Dec. 16, 1952 H. C. A. VAN DUUREN 2,622,148

ERROR DETECTOR FOR TELEGRAPH PRINTER CODES

Filed March 15, 1949

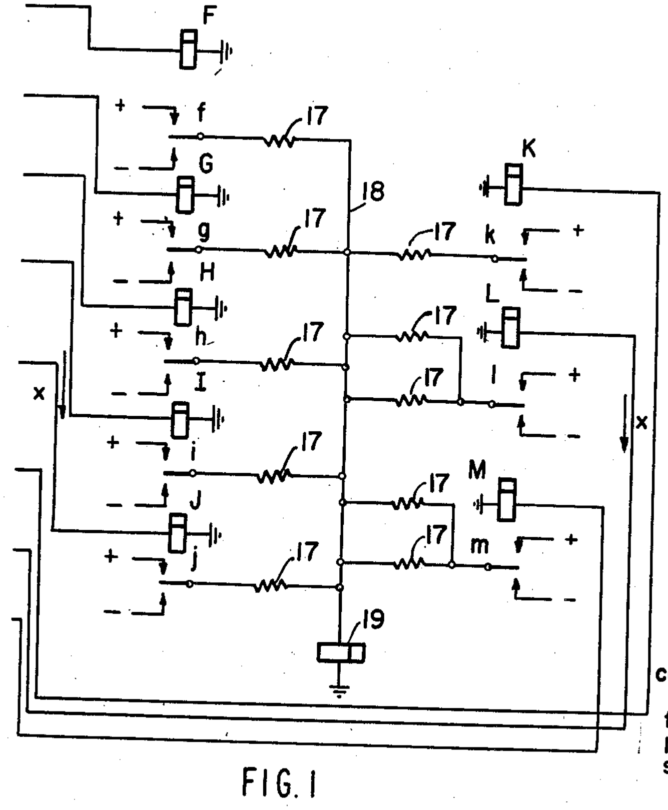

FIG. 1

| | 1 2 3 4 5 | 1 2 3 4 5 6 7 8 |
|---|---|---|
| a | x x o o o | x x o o o x x o |
| b | x o o x x | x o o x x o x o |
| c | o x x x o | o x x x o o x o |
| d | x o o x o | x o o x o x x o |
| e | x o o o o | x o o o o o x x |
| f | x o x x o | x o x x o o x o |
| g | o x o x x | o x o x x o x o |
| h | o o x o x | o o x o x x x o |
| i | o x x o o | o x x o o x x o |
| j | x x o x o | x x o x o o x o |
| k | x x x x o | x x x x o x o o |
| l | o x o o x | o x o o x x x o |
| m | o o x x x | o o x x x o x o |
| n | o o x x o | o o x x o x x o |
| o | o o o x x | o o o x x x x o |
| p | o x x o x | o x x o x o x o |
| q | x x x o x | x x x o x x o o |
| r | o x o x o | o x o x o x x o |
| s | x o x o o | x o x o o x x o |
| t | o o o o x | o o o o x o x x |
| u | x x x o o | x x x o o o x o |
| v | o x x x x | o x x x x x o o |
| w | x x o o x | x x o o x o x o |
| x | x o x x x | x o x x x x o o |
| y | x o x o x | x o x o x o x o |
| z | x o o o x | x o o o x x x o |
| carriage return | | o o o x o o x x |
| line feed | | o x o o o o x x |
| figures | x x o x x | x x o x x x o o |
| letters | x x x x x | x x x x x o o o |
| space | o o x o o | o o x o o o x x |
| | o o o o o | o o o o o x x x |

FIG. 2

FIG. 3

GROUP 1

| | | |
|---|---|---|
| SPACE | o o X o o | X X |
| LINE FEED | o X o o o | X X |
| e | X o o o o | X X |
| carr. ret. | o o o X o | X X |
| t | o o o o X | X X |

GROUP 2

| | | |
|---|---|---|
| r | o X o X o | o X |
| s | X o X o o | o X |
| l | o X o o X | o X |
| h | o o X o X | o X |
| d | X o o X o | o X |

GROUP 6

| | | |
|---|---|---|
| z | X o o o X | o X |
| o | o o o X X | o X |
| n | o o X X o | o X |
| a | X X o o o | o X |
| i | o X X o o | o X |

GROUP 3

| | | |
|---|---|---|
| y | X o X o X | o o |
| g | o X o X X | o o |
| f | X o X X o | o o |
| j | X X o X o | o o |
| P | o X X o X | o o |

GROUP 4

| | | |
|---|---|---|
| c | o X X X o | o o |
| u | X X X o o | o o |
| w | X X o o X | o O |
| m | o o X X X | o o |
| b | X o o X X | o o |

| | | |
|---|---|---|
| figures | X X o X X | X |
| x | X o X X X | O |
| v | o X X X X | |
| g | X X X o X | |
| k | X X X X o | |
| | X X X X X | |
| | o o o o o | |

code converter contact circuit info:

Signal I
Signal II
Signal III

GROUP 5

| | |
|---|---|
| o o o X X | X o |
| X o o o X | X o |
| X X o o o | X o |
| o o X X o | X o |
| o X X o o | X o |
| o X o X o | X o |
| X o X o o | X o |
| o o X o X | X o |
| o X o o X | X o |
| X o o X o | X o |

INVENTOR.
Hendrik Cornelis Anthony van Duuren

BY Brown, Jackson, Boettcher & Dienner

ATTYS.

Patented Dec. 16, 1952 2,622,148

UNITED STATES PATENT OFFICE 2,622,148

ERROR DETECTOR FOR TELEGRAPH PRINTER CODES

Hendrik Cornelis Anthony van Duuren, Wassenaar, Netherlands, assignor to Staatsbedrijf der Posterijen, Telegrafie en Telefonie, The Hague, Netherlands Application March 15, 1949, Serial No. 81,572
In Great Britain March 15, 1948

5 Claims. (Cl. 178—23)

This invention relates to apparatus for converting signals in one code into signals in another. Among the various possible applications of code-converters in accordance with the invention are: employment as a junction device between a landline and a radio channel or vice versa or employment for controlling Linotype machines employing a 7 unit code by telegraph signals on, for example a 5 unit code.

The use of equal length codes, that is, codes in which each of the signals comprises a predetermined total number of marking and spacing elements in coded arrangements has become somewhat standard in the telegraphy field. One of the more commonly accepted codes of this type is the Baudot code in which each signal consists of five elements arranged in various coded combinations to thereby provide the number of different signals required for message transmission. See for example British Patent 519,833 issued April 9, 1940.

In the transmission of these five element signals over wireless systems, however, the possibility of element transposition is extremely great, and it has accordingly become conventional practice to build up the five element signals to signals comprising seven or eight elements. One well known method, for example, consists of building each signal up to comprise a total of seven elements, of which three are marking units and four are spacing units. Such manner of code conversion, of course, requires equipment which is somewhat complicated in nature and therefore somewhat slower and possibly less accurate in operation.

There is a definite need therefore for a simplified signaling system in which the completed signal comprises the basic five element signal in its unaltered state and a supplemental portion comprising a given number of additional elements in coded arrangement.

Serious problems have long prevented the previous provision of such desirable type signalling equipment. For example, even with the built-up type signal, atmospheric and power line disturbances frequently result in message mutilation, and it has become mandatory in the field, therefore, to provide coded signals which are adapted for simplified monitoring at the receiving end of the telegraphy system. The more conventional types of equipment employ apparatus, therefore, which is operative to convert signals in the five element code into seven element signals, each of which comprises the same number of marking elements 3 and the same number of spacing elements 4. Various types of integrating devices are further provided at the receiving end of the system for scanning each signal to determine the existence of this given number of marking and signalling elements on receipt of each signal and for registering a fault signal whenever the given number of elements is not present.

In using this type of signal and monitoring system, it has proven impractical to retain the five unit signal, without alteration, in the completed seven or eight unit signal of the described type, and accordingly the various types of code converting equipment and monitoring equipment known heretofore have been extremely complicated in structure and operation.

It is our object in this invention therefore to provide a more simple, accurate, and reliable type telegraphy system having a transmitting unit which receives five unit elements of the conventional Baudot code from tape members, which converts the signal into seven or eight elements in a simple, expeditious manner, and which monitors the resultant seven or eight element signal in a reliable and accurate manner.

The present invention which seeks to simplify code-converters and to provide various other advantages in the way of saving time and facilitating monitoring consists basically in so arranging matters that the multiple-element-code on one channel contains the signals of the original code on the other channel with the simple addition of a few units. Starting for instance with the conventional 5-unit code this can be simply converted into an 8-unit code by adding 3 elements. These three elements are so grouped as to express in effect how many mark elements the original 5-unit signal contained. Then by applying the basic and supplemental signals to a bridge arrangement for comparison purposes and thence to a fault-finding relay in the galvanometer branch thereof a good reliable fault indicating arrangement will be obtained.

Thus, after converting the 5 unit code into 8 unit code the signals, now in 8 unit code may be transmitted on a radio channel. The 5 unit code is shown in the left hand column of Figure 1. The 5 unit signals may be those obtained, for example from an automatic keyer.

The 8 unit code is obtained from the 5 unit code by adding three elements in such manner that the added elements are characteristic of the number of marking elements in the 5 unit signal. A novel code converter for providing such conversion is shown in my copending application which was filed April 18, 1951, as Serial No.

221,612, and which was assigned to the assignee of this invention. The added elements have 8 possible variations viz. X00, 0X0, 00X, XX0, 0XX, X0X, 000 and XXX, where X signified a mark and 0 a space, whereas the number of marks in the 5 unit signal is 0, 1, 2, 3, 4 or 5.

Referring now to the drawings, Figure 1 illustrates an example of a fault-indicating circuit for a receiving station for such an 8 unit code. There are eight relays whose two-position armatures are indicated by the letters *f* to *m* inclusive. The armatures *f* to *j* inclusive are set to positions determined by the first 5 units of a signal and the armatures *k* to *m* inclusive are set to positions determined by the last three units of the signal.

Figure 2 is a tabulation of the conventional five element Baudot code as received by the convertor and the eight element code provided thereby in the manner set forth in the aforementioned copending application. Study of such table shows that the eight element signal in each case is comprised of the five element signal plus a supplement based on the number of marking elements in the basic signal.

With reference to Figure 1, there is illustrated thereat an arrangement which is adapted to compare the basic five element portion of the completed signal with the indications encoded in the supplemented portion of the signal, it being apparent that each signal when accurately generated will have such given basic relation. The circuit is shown for illustrative purposes as being connected to the output side of a code converter unit, but it is obvious that the circuit arrangement could be mounted at any point in the telegraphy system which carries the eight element signal.

The signal receiving relays F to M inclusive are arranged to respond to the eight element signal as completed, each relay being associated with a particular element of the sequence of elements of which the signal is comprised. Relay F, for example, responds to the first element of each of the signals, relay G to the second element, and so forth.

Each of the relays F to M has associated therewith a movable contact member, *f* to *m*, which is operated by the relay, with appearance of a space element on its associated conductor, into engagement with an upper stationary contact having positive battery connected thereto; and which, with appearance of a marking element thereon, is moved into engagement with a lower contact having negative battery connected thereto.

The movable contacts associated with the first five relays F to J, which are connected to the conductors carrying the basic portion of the signal, are connected over individual resistances, such as 17, to a vertical conductor 18 and a fault finding relay 19, each of the resistance members 17 being of an equal value.

Relays K to M, which are connected to the conductors carrying the supplemental portion of the signal, have their movable contacts connected to the opposite side of the vertical conductor 18 to effect, in toto, a circuit arrangement which is comparable to a bridge type circuit in which the relay 19 comprises the galvanometer member thereof.

The movable contacts *k*, *l* and *m* are arranged to be alternatively operated into engagement with positive or negative battery in the manner of contacts *f* to *j*, but are connected to vertical conductor 18 and relay 19 over a somewhat different resistance arrangement. Contacts *k*, for instance, are connected to a single resistance 17, whereas contacts *l* and *m* are each connected to conductor 18 over a pair of resistance members 17.

The connection of the five resistances to conductor 18 in a particular manner by relays F to J with receipt of the basic portion of the signal will thus effect the connection of a particular value of voltage to relay 19 which is the result of the difference of number of resistances connected to plus and minus battery respectively. Relays K to M are arranged to be operated with receipt of the supplemental portion of the signal to connect their associated resistances to the potential sources to effect an equal value of voltage of opposite polarity on conductor 18 to prevent operation of relay 19.

For example, with proper receipt of the letter "*a*" in the eight element signal (XX000 XX0) contacts *f*, *g*, *k* and *l* will be operated to engage their lower contacts and contacts *h*, *i*, *j*, *m* will be operated to engage their upper contacts. Thus the extra resistance connected to negative battery on the left hand side of conductor 18 is balanced by the extra resistance connected to positive battery on the right hand side of the conductor if the signal has been correctly formed. Should the signal be incorrectly formed an obvious unbalance in the bridge arrangement will be effected and operation of the fault finding relay 19 will result.

It is apparent from the foregoing that although the presence of marking elements effects the connection of −120 volt battery to the channel, which, in turn, determines the operative state of the relays, the supplemental signal is nevertheless indicative of the number of spacing elements as well as the number of marking elements in the basic signal.

The code conversion described has considerable advantage from a monitoring point of view, the first five units being simply transmitted straight through.

The invention also provides a 5–7 unit code-converter in which most of the transformations from 5 to 7 unit code are effected by the simple addition of two units.

The 5 unit code may be imagined to be built up of the following basic signals, from each of which 4 other signals are derivable by shifting 2 to the right or 2 to the left:

| | |
|---|---|
| 1 00X00 | 4 0XXX0 |
| 2 0X0X0 | 5 XX0XX |
| 3 X0X0X | 6 X000X |

These 6 basic groups thus yield 30 signals (see Figure 3). The signals XXXXX and 00000 make up the full 32. To 1 may be added XX in order to make the corresponding 7 unit signal having 3 marks and 4 spaces. To 2 and 6 may be added 0X or X0; only 0X is used for the present. The transformation with X0 yields 10 signals, which, though correct 7 unit signals, do not correspond to 5 unit signals obtained by simply taking away the 2 last units. These will be used to represent 5-unit signals which may not be transformed in the simple manner indicated. There are five such cases namely signal XXXXX and signal 00000 and signals for forming the 3 warning signalling variations used in the 7 unit code. For effecting these conversions a code-converter circuit which does not form part of the present invention is required. However such a code-converter is much simpler than would be one required to deal with the entire code.

Code signals as used for Linotype machines often have 6 elements. With a seventh element to indicate the channel for which they are destined they can be expressed in a signal with 7 as the basic element number. Then at a second group of 7 elements 3 units can be given to indicate the number of mark elements in the above 7-unit signal, in order thus to render it possible to provide, at the receiver, a fault finder arrangement as already described. The remaining 4 elements in this group can likewise serve to protect a further 7-unit signal at a third set of 7 contacts.

Such codes can be usefully employed in controlling Linotype machines over telegraph apparatus on a 7-unit basis.

While I have illustrated and described what I regard to be the preferred embodiment of my invention, nevertheless it will be understood that such is merely exemplary and that numerous modifications and rearrangements may be made therein without departing from the essence of the invention, I claim:

1. In a radio telegraph system, wherein the basic signals each comprise a combination of elements of one class and elements of another class in coded arrangements of a predetermined number, and in which each completed signal for transmitting purposes comprises a basic unaltered signal supplemented by a predetermined number of signal elements, said supplemental elements being indicative of the number of elements of said one class and said other class correctly included in said basic signal portion, the combination of monitoring apparatus comprising scanning means for determining the number of elements of said one class and said other class included in the basic portion of the completed signal, and decoding means for determining the number of elements of said one class and said other class which are indicated by said supplemental signal portion as being present in said basic signal portion, comparing means for comparing the actual number of elements of said one class and said other class in the basic signal portion as received by said monitor with the number of like elements indicated by the received supplemental portion of said signal, and indicating means for signaling detection of a faulty signal only when the basic and supplemental signals on comparison have numbers of different values.

2. In a radio telegraph system wherein the basic signals each comprise a combination of elements of one class and elements of another class in coded arrangements of a predetermined number, and in which each completed signal for transmitting purposes comprises a basic unaltered signal supplemented by a predetermined number of signal elements, said supplemental elements being indicative of the number of elements of said one class correctly included in said basic signal portion, the combination of monitoring apparatus comprising scanning means for determining the number of elements of said one class included in the basic portion of the completed signal, and decoding means for determining the number of elements of said one class which are indicated by said supplemental signal portion as being present in said basic signal portion, comparing means for comparing the actual number of elements of said one class in the basic signal portion as received by said monitor with the number of elements of said one class indicated by the received supplemental portion of said signal, and indicating means for signaling detection of a faulty signal only when the basic and supplemental signals on comparison are numbers of different values.

3. In a radio telegraph system wherein the basic signals each comprise a combination of marking and spacing elements in coded arrangements of a predetermined number, and in which each completed signal for transmitting purposes comprises a basic unaltered signal supplemented by a predetermined number of signal elements, said supplemental elements being indicative of the number of marking elements correctly included in the basic portion of the signal, the combination of monitoring apparatus comprising a first relay control means for determining the number of marking elements actually included in the basic portion of the completed signal as received thereby and for providing an output signal which is representative of the number determined, second relay means for decoding the supplemental portion of the code to determine the indicated number of marking elements in the basic signal portion and for providing an output signal which is representative of the indicated number as determined, means for comparing said generated representative signal output, and indicating means for signalling the detection of a faulty signal only when the generated outputs of the two relay circuits are unequal in value.

4. In a radio telegraph system wherein the basic signals each comprise a combination of marking and spacing elements in coded arrangements of a predetermined number, and in which a completed signal for transmitting purposes comprises a basic unaltered signal supplemented by a predetermined number of signal elements, said supplemental elements being indicative of the number of marking elements correctly included in the basic portion of the signal, the combination of monitoring apparatus comprising indicating means for signalling detection of a faulty signal, scanning means for examining each of the elements of the completed signal to determine the number of marking elements actually included therein and for decoding the supplemental portion of the signal to determine the number of marking elements indicated as being in the basic signal portion, switch means controlled by said scanning arrangement for applying a predetermined potential of a given polarity to said fault indicating means, which potential is proportional to the number of marking elements actually detected in the basic portion of the signal; and secondary switch means for applying to said fault indicating means a potential of opposite polarity, which is proportional to the indicated number of marking elements in the signal basic portion, said first and second switch means being operative to apply equal and opposite values of potential when said actual and indicated values are alike, whereby said fault indicating means are operative whenever the resultant values and applied potentials are unequal in value.

5. In a radio telegraph system, wherein the basic signals each comprise a combination of marking and spacing elements in coded arrangements of a predetermined number, and in which a completed signal for transmitting purposes comprises a basic unaltered signal supplemented by a predetermined number of signal elements, said supplemental portion being indicative of the number of marking elements correctly included in the basic portion of the signal, the combination of receiving apparatus comprising a fault indicating device, scanning means for examining each of the elements of the completed signal, which scanning means comprise a first series of relays for determining the number of marking elements in the basic portion of the signal, each of said relays being associated with a particular sequence element of the basic portion of said signal and being adapted to connect a source of potential of positive polarity over an associated resistance to said fault indicating device whenever its associated element is a spacing element, and a negative source of potential whenever its associated element is a marking element; and a second series of relays which is similarly associated with the supplemental portion of said signals, at least one of the relays of said second series having associated therewith a single resistance over which the selected one of said alternative polarity potential sources is connected to said fault indicating means, and the remainder of said second series of relays each being operative to connect the selected one of said alternative sources of polarity over a plurality of resistance members, the total number of said resistances controlled by said second series of relays being equivalent to those controlled by said first series of relays, said first and second relays being operated by the elements of the incoming signal to connect said potential sources over said associated resistances in a balanced manner to effect approximately zero potential at the terminal of said fault finding device whenever the indicated and actual number of marking elements in the basic portion of the signal are similar, and to connect operating potential to said device whenever the indicated and actual numbers are dissimilar.

HENDRIK CORNELIS ANTHONY VAN DUUREN.

REFERENCES CITED

The following references are of record in the file of this patent:

UNITED STATES PATENTS

| Number | Name | Date |
|---|---|---|
| 2,153,737 | Spencer | Apr. 11, 1939 |
| 2,183,147 | Moore et al. | Dec. 12, 1939 |
| 2,235,755 | Bakker et al. | Mar. 18, 1941 |
| 2,279,353 | Van Duuren | Apr. 14, 1942 |
| 2,471,126 | Spencer et al. | May 24, 1949 |
| 2,473,202 | Higgitt | June 14, 1949 |
| 2,484,226 | Holden | Oct. 11, 1949 |